March 19, 1940. H. ALLEN 2,194,261
GATE VALVE, SEAT, AND PACKING
Filed May 7, 1937   3 Sheets-Sheet 1
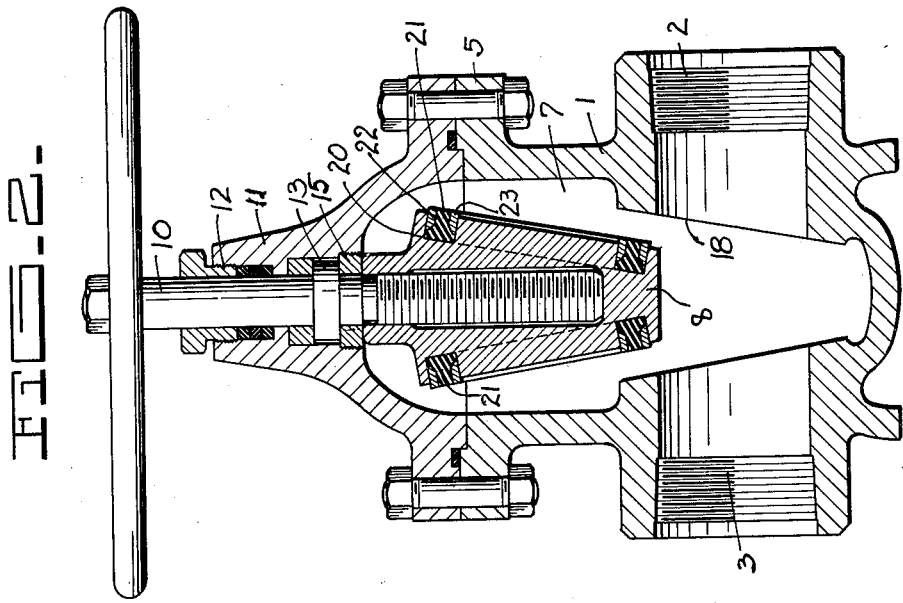
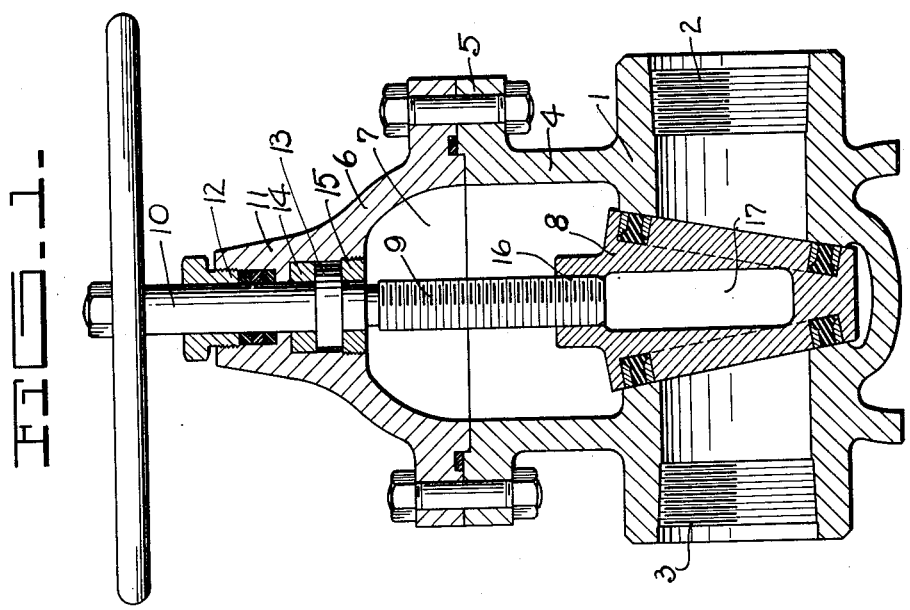
Herbert Allen INVENTOR
BY Jesse R. Stone
Lester B. Clark
ATTORNEYS

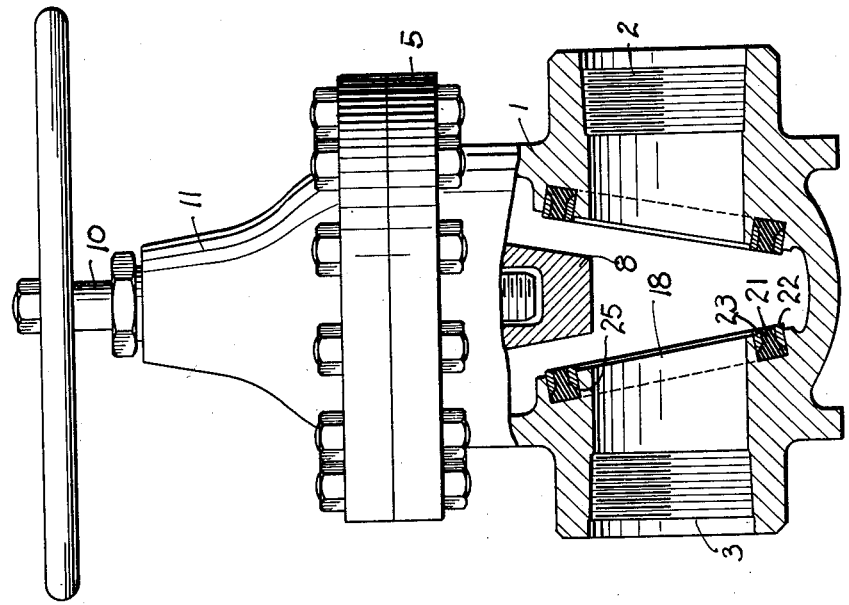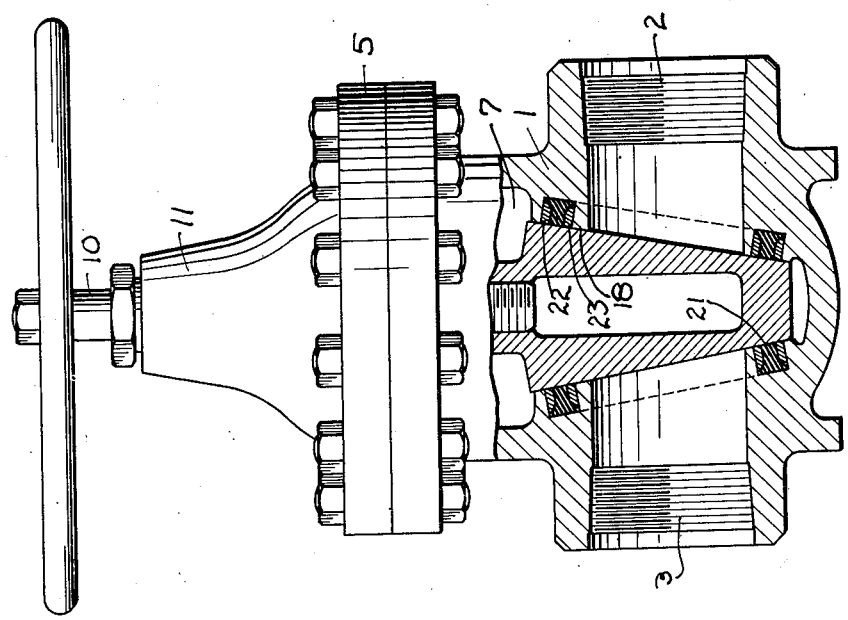

March 19, 1940.  H. ALLEN  2,194,261
GATE VALVE, SEAT, AND PACKING
Filed May 7, 1937  3 Sheets-Sheet 3
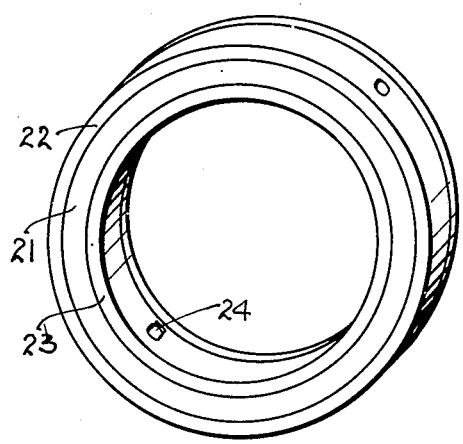
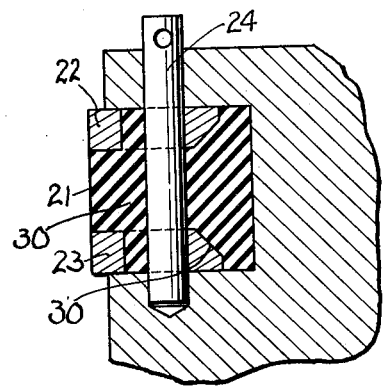
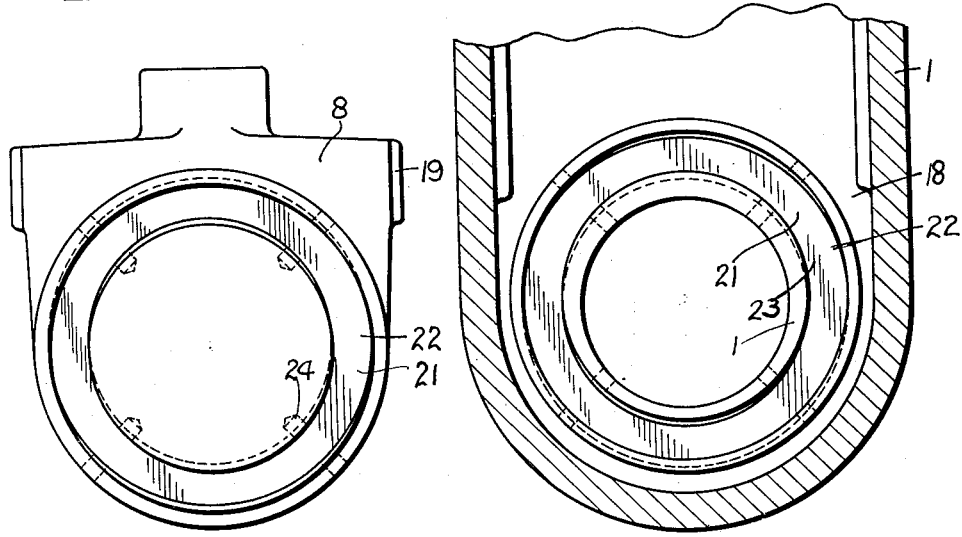
Herbert Allen INVENTOR
BY Jesse R. Stone
 & Lester B. Clark
ATTORNEYS Patented Mar. 19, 1940

2,194,261

UNITED STATES PATENT OFFICE 2,194,261

GATE VALVE, SEAT, AND PACKING

Herbert Allen, Houston, Tex., assignor to Cameron Iron Works, a corporation

Application May 7, 1937, Serial No. 141,227

4 Claims. (Cl. 251—59)

The invention relates to the construction of the sealing means in connection with valves, particularly with gate valves.

It is an object of the invention to provide a sealing means adapted, when the valve is seated by being moved to closed position, to form a seal which will remain effective for comparative long periods of time.

It is an object of the invention to provide a gate valve packing means which includes a sealing device which will flow into sealing position to create a seal in all directions and which will move into position where it will maintain its sealing function even after material wear occurs.

Another object is to provide in connection with the sealing ring in a valve of this character a lateral support for the sealing ring which also serves to assist in directing the flow of the flexible portion of the seal so as to compensate for wear in the ring.

With reference to the drawings herewith:

Fig. 1 is a central vertical section through a valve embodying the invention, the valve being shown in closed position.

Fig. 2 is a similar view showing the valve in open position.

Fig. 3 is a side view partly in central vertical section showing the invention with the seal disposed in the valve body and in closed position.

Fig. 4 is a view similar to Fig. 3 but with the valve in open position.

Fig. 5 is a perspective view of the sealing ring independently of its support.

Fig. 6 is a broken section through a portion of the sealing ring showing one manner in which it may be secured in its support.

Fig. 7 is a side elevation of the valve gate of Fig. 2 with the packing thereon.

Fig. 8 is a side elevation of the valve seat of Fig. 4 with the packing therein.

Referring particularly to Figs. 1 and 2, there is shown a gate valve housing 1 having a transverse passage therethrough with inlet or outlet ports 2 and 3 respectively, and a laterally extending bonnet 4. The outer end of the bonnet is provided with a flange 5 for attachment to a cap 6, which closes the outer end of a chamber 7 in which the valve member 8 is adapted to move.

The valve 8 is screwed upon the lower end of the threaded portion 9 of the valve stem 10. The stem is extended through the upper portion 11 of the cap 6 and is sealed therein by means of a stuffing box 12.

The valve stem is of the non-rising type and is prevented from longitudinal movement through the cap 6 by a radial flange 13 which engages on its outer side with a thrust ring 14 and on its inner side with a locking ring 15.

The lower threaded end 9 of the stem engages within the threaded neck 16 of the valve 8. The interior of the valve has a recess 17 to accommodate the valve stem when the valve is raised upwardly from its seat. The valve member is wedge shaped in cross section to engage within a downwardly tapered chamber 7 in the valve body 1 which has opposed seats 18. As will be seen from Fig. 7, the valve member 8 is provided with two laterally extending keys or ribs 19 which interengage with a similar rib on the wall of the housing to prevent relative rotation and to guide the valve member into its seat.

The two opposite flat sides of the valve member 8 which are presented toward the seats 18 are provided with sealing members to engage the seat. Said sealing members are of peculiar formation in order to provide a seal which will withstand enormous pressures and will be resistant to wear and cutting due to leakage. Each sealing member is ring-shaped and fits within an annular recess 20 in the side of the valve gate. The seal ring is made up of a body of packing 21 which may be normally of a good quality of rubber although manifestly any equivalent substitute may be used so long as it is flexible or resilient. Adjacent the outer side of the rubber body 21 are wear plates 22 and 23. These wear plates are preferably vulcanized or otherwise attached to the sealing member 21 so that they form a part thereof and they may be rectangular in cross section.

The rear edge 30 of each of the plates 22 and 23 may be beveled as seen in the enlarged view in Fig. 6 so that the front portion 31 of the packing will be confined between the plates and the entire packing ring with the plates disposed in the recess 20 as a unitary part. The sealing ring, together with the wear plates 22 and 23, may be retained against movement from the recess 20 by means of transverse pins 24, as indicated in Fig. 6. The wear plates 22 and 23 are provided with slots elongated transversely thereof to allow for their movement, as will be later described.

The sealing surface of the ring as thus formed is adapted to wear for a materially long period because the resilient portion is confined and protected. When the valve member 8 is screwed downwardly by the rotation of the valve stem 10, it will be moved from the position shown in Fig. 2 into the position shown in Fig. 1. As the valve is moved to its seat the outer surface of each of the sealing rings will contact with its annular seat 18 and will form a seal therewith. The forcible seating of the ring will move the wear plates 22 and 23 against the seats 18 where they will assume a close contact with the seat. If the gate member 8 negotiates any movement after the wear plates have contacted the seat, then, of course, the recess 20 will move slightly downward relative to the seat and the gate member will wedge a little farther in between the seats 18. In view of the fact that the wear plates are metal and the packing body 21 is resilient, any movement of the gate toward the seat forces the resilient material of the packing forwardly so that the thickened rear portion is extruded outwardly between the plates so that it is available to compensate for any of the packing material that is worn or torn away due to pressure. This flowing of the packing material to compensate for wear and to fill any recesses or leaks and to abut against every available surface is of advantage because pressure applied at any point is transmitted in all directions to effect a seal. The maximum compensation occurs when the gate has moved to a position such that it has telescoped completely over the plates and has extruded a substantial body of the packing.

It will be noted that a sealing surface formed in this manner will be not only strong and adapted to undergo considerable wear, but the wear plates 22 and 23 will support the side walls of the sealing member when in the position shown in Fig. 2 and as the sealing face gradually wears additional material will flow forward to compensate therefor because the rubber is forced outwardly between the rings so as to maintain a sealing surface for a relatively long period. This is an element of material value in valves of this type because of the tendency of such valves to wear rapidly.

In Figs. 3 and 4, there is shown a sealing ring position within the valve seat 18 instead of upon the valve member 8.

To carry out this embodiment of the invention the valve seat 18, which is of annular shape, will be formed with an annular recess 25 therein to receive the ring. The sides of the ring presented toward the valve are fitted with the wear plates 22 and 23 so that when the valve member 8 is moved to closed position its opposite flattened faces will contact with the inner surfaces of each of the rings and with the wear plates. The action in sealing will thus be the same as in the previous embodiment. The wear upon the sealing surface of the ring will be taken up gradually by the depression into the recess of the wear plates 22 and 23. As the wear upon the sealing ring occurs it will be possible to gradually force the valve 8 further and further into its seat until eventually the whole sealing ring is housed within the recess 25.

In both embodiments of the invention I am able to obtain the same advantages of a relatively strong sealing member reinforced on both sides by the wedge rings, said sealing member being constructed to take up for wear in the sealing member and still maintain a tight seal for a relatively long period of time with the seal maintained with equal pressure throughout its area. Thus if the valve should be unequally seated in either form of the device the pressure would be evenly distributed through the packing 21 so that even seating of the wear plates would result because the resilient packing would have a tendency to equalize itself by either a transverse or a circumferential flow.

What is claimed as new is:

1. A sealing member for valves including a rubber gasket shaped to fit within a recess in the sealing surface and to project slightly therefrom, wear plates of rigid material floating upon said gasket on the outer and inner sides thereof and adapted to be forced into said recess to displace the rubber therein in the manner described.

2. A device to abut a seat to seal an opening through the seat against pressure, a packing ring carried by the device, means on the packing disposed to abut the seat and confine the packing, means to force the device toward the seat to compress the packing and establish a pressure in the confined packing of a value greater than that in the opening to be sealed, said first means comprising a metal ring on both the inner and outer peripheries of the packing ring.

3. A packing assembly for valves comprising an annular ring of resilient packing material, inner and outer peripheries on said packing ring, a rigid wear and confining ring imbedded in each said inner and outer peripheries of said ring so as to confine the resilient material and protect it against wear.

4. A device to abut a seat to seal an opening through the seat against pressure, a packing ring carried by the seat, means on the packing disposed to abut the device and confine the packing, means to force the seat toward the device to compress the packing and establish a pressure in the confined packing of a value greater than that in the opening to be sealed, said first means comprising a metal ring on both the inner and outer peripheries of the packing ring.

HERBERT ALLEN.